(12) United States Patent
Hudson

(10) Patent No.: US 9,399,873 B2
(45) Date of Patent: Jul. 26, 2016

(54) SNOW GUARD FOR A PHOTOVOLTAIC ARRAY

(71) Applicant: SolarCity Corporation, San Mateo, CA (US)

(72) Inventor: Ty Hudson, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/729,440

(22) Filed: Jun. 3, 2015

(65) Prior Publication Data

US 2016/0123016 A1    May 5, 2016

Related U.S. Application Data

(60) Provisional application No. 62/075,073, filed on Nov. 4, 2014.

(51) Int. Cl.
*E04D 13/10* (2006.01)

(52) U.S. Cl.
CPC .............. *E04D 13/10* (2013.01); *E04D 13/106* (2013.01); *E04D 13/103* (2013.01)

(58) Field of Classification Search
CPC ..... E04D 13/10; E04D 13/103; E04D 13/106; E04D 2013/0481; E04D 2013/0486; E04D 13/076; E04D 13/0762

USPC ........................................................ 52/24, 26
See application file for complete search history.

(56) References Cited

U.S. PATENT DOCUMENTS

| 390,061 | A | * | 9/1888 | Bower ............................... 52/24 |
| 3,289,361 | A | * | 12/1966 | Holliday ........................... 52/24 |
| 3,296,750 | A | | 1/1967 | Zaleski |
| 5,070,660 | A | * | 12/1991 | Willa ................................ 52/24 |
| 5,343,659 | A | * | 9/1994 | Zaleski ............................. 52/24 |
| 5,522,185 | A | * | 6/1996 | Cline ................................ 52/24 |
| 6,470,629 | B1 | * | 10/2002 | Haddock ........................... 52/24 |
| 6,688,047 | B1 | * | 2/2004 | McNichol ........................ 52/25 |
| D512,303 | S | | 12/2005 | Prichard, Jr. et al. |
| 7,127,852 | B1 | * | 10/2006 | Dressler ............................ 52/24 |
| 8,528,888 | B2 | * | 9/2013 | Header ............................ 269/91 |
| 8,763,311 | B2 | | 7/2014 | Lupski |
| 2004/0221886 | A1 | | 11/2004 | Oono |
| 2011/0248131 | A1 | * | 10/2011 | Genschorek ............. 248/220.22 |
| 2013/0333305 | A1 | | 12/2013 | Stearns et al. |
| 2014/0252288 | A1 | | 9/2014 | Stearns |

* cited by examiner

*Primary Examiner* — Phi A
(74) *Attorney, Agent, or Firm* — Kilpatrick Townsend & Stockton LLP

(57) ABSTRACT

A snow guard for a photovoltaic array that has a snap-in retrofit design in which a spring is pushed in to lock a clamp into a side groove in a photovoltaic module, thereby securing the snow guard to the side of the photovoltaic module.

12 Claims, 7 Drawing Sheets

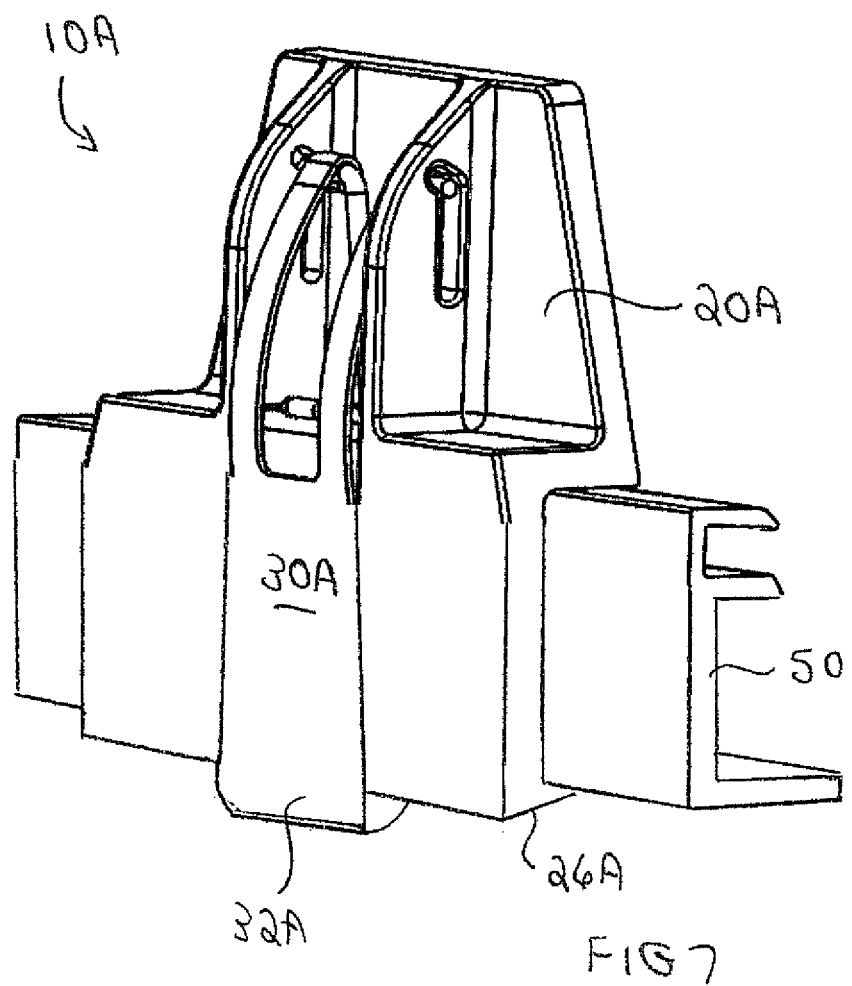

SNOW GUARD FOR A PHOTOVOLTAIC ARRAY

RELATED APPLICATION

The present application claims priority to U.S. Provisional Patent Application Ser. No. 62/075,073, of same title, filed Nov. 4, 2014, incorporated herein by reference in its entirety for all purposes.

TECHNICAL FIELD

The present invention relates to snow guards mounted onto photovoltaic arrays that prevent large amounts of snow and ice from shedding from the photovoltaic array all at once.

BACKGROUND OF THE INVENTION

A variety of different snow guard designs for photovoltaic arrays currently exist. Typically, these snow guards operate by providing upwardly projecting legs, fences or other projections sticking out of the top side of the array. These projections prevent slippage and hold the snow and ice on the array and such that snow and ice does not shed in large blocks, but instead only comes off the array in smaller chunks. As such, snow guards are a safety feature, protecting building occupants from dangerous large blocks of snow and ice falling off of the roofs of their buildings.

Unfortunately, current snow guard designs are bulky and require excessive time, effort and hardware to install. They are also hard to retrofit onto an existing array. What is instead desired is a snow guard that is fast and easy to install, preferably with minimal amount of hardware (or ideally no hardware at all). Ideally, such a snow guard solution would be easily retrofittable onto existing solar arrays. As will be shown, the present invention provides such a system.

SUMMARY OF THE INVENTION

The present system provides a snow guard for a photovoltaic array that has a snap-in retrofit design in which a spring is pushed in to lock a clamp into a side groove in a photovoltaic module, thereby securing the snow guard to the side of the photovoltaic module.

In preferred aspects, the present system provides a snow guard for a photovoltaic array, preferably comprising: (a) a main body, the main body having a support surface dimensioned to sit on top of a photovoltaic module, an upwardly facing snow retaining projection, and a grasping portion dimensioned to be received into a side groove in the photovoltaic module; (b) a clamp that slides against a side of the main body from an unlocked position to a locked position, wherein the clamp has a grasping portion dimensioned to be received into the side groove in the photovoltaic module, and wherein the grasping portion engages with the side groove when the clamp is in the locked position; and (c) a retaining mechanism that engages to hold the clamp in the locked position.

In one preferred aspect, the retaining mechanism is a U-shaped mechanical spring that has a pair of opposite ends that connect to the clamp and a center section that is received against a shelf on the side of the main body when the clamp is in the locked (i.e.: fully upward) position. The advantage of this design is that an installer can retrofit the present snow guard onto an existing photovoltaic array by simply inserting the snow guards into the gaps between the photovoltaic modules and then snapping them into a locked position on the sides of the modules. This snap-in fitting can advantageously be achieved by an installer using one hand, and no tools. Specifically, the installer need only push the center position of the spring into a locked position on the main body of the snow guard, and the snow guard will hold firmly onto the side of the module to which it is attached. As such, the mechanical spring flexes when in the locked position to hold the clamp upwards such that the grasping portion of the clamp pushes against a top edge of the side groove when the bottom grasping portion of the main body pushes down into the bottom of the side groove and the support surface of the main body pushes downwardly on the photovoltaic module.

BRIEF DESCRIPTION OF THE DRAWINGS

FIG. 7 is a front perspective view of an alternate embodiment of the snow guard for use with photovoltaic modules not having side grooves.

DETAILED DESCRIPTION OF THE DRAWINGS

Figure 1:
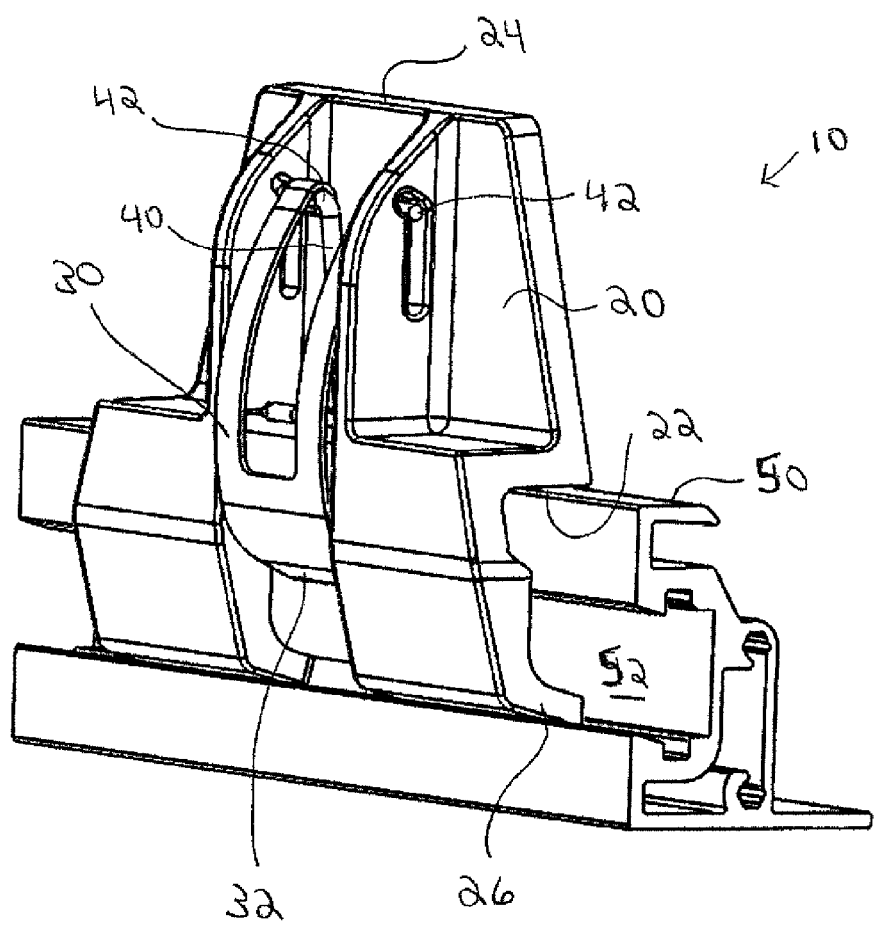
FIG. 1 is a front perspective view of the snow guard in the locked position.
Figure 2:
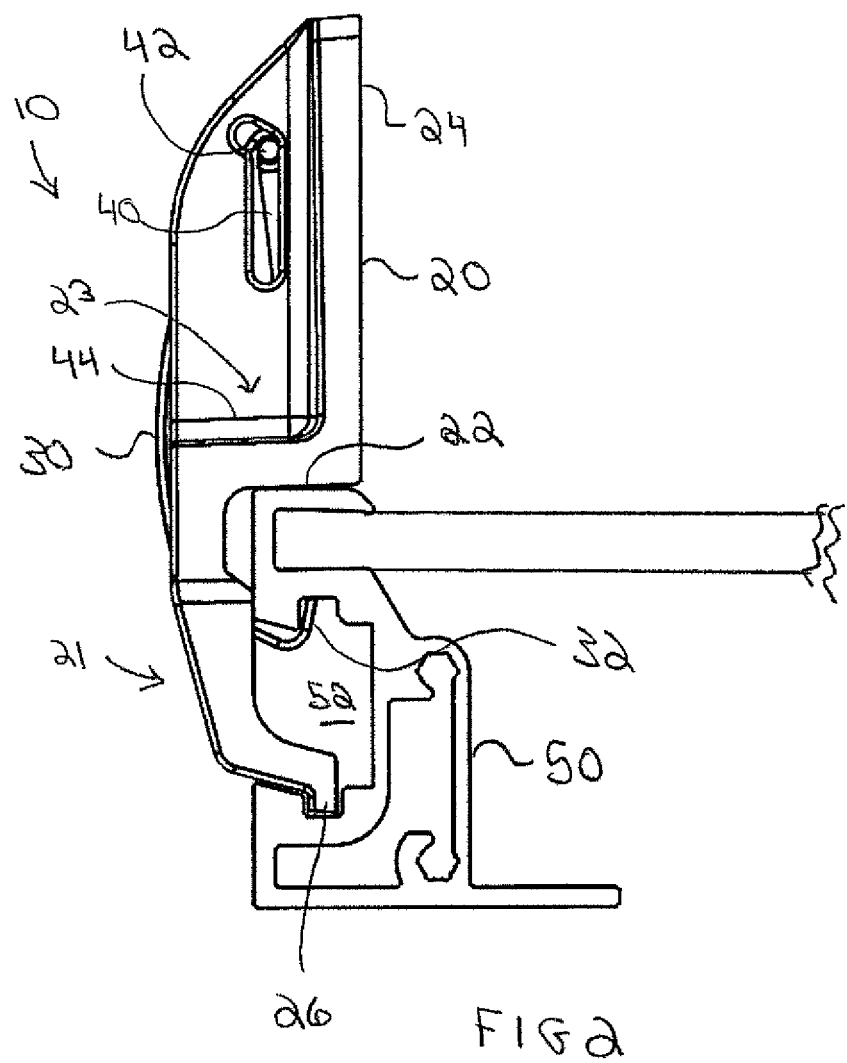
FIG. 2 is a side elevation view corresponding to FIG. 1, further including a side of a photovoltaic module.
Figure 3:
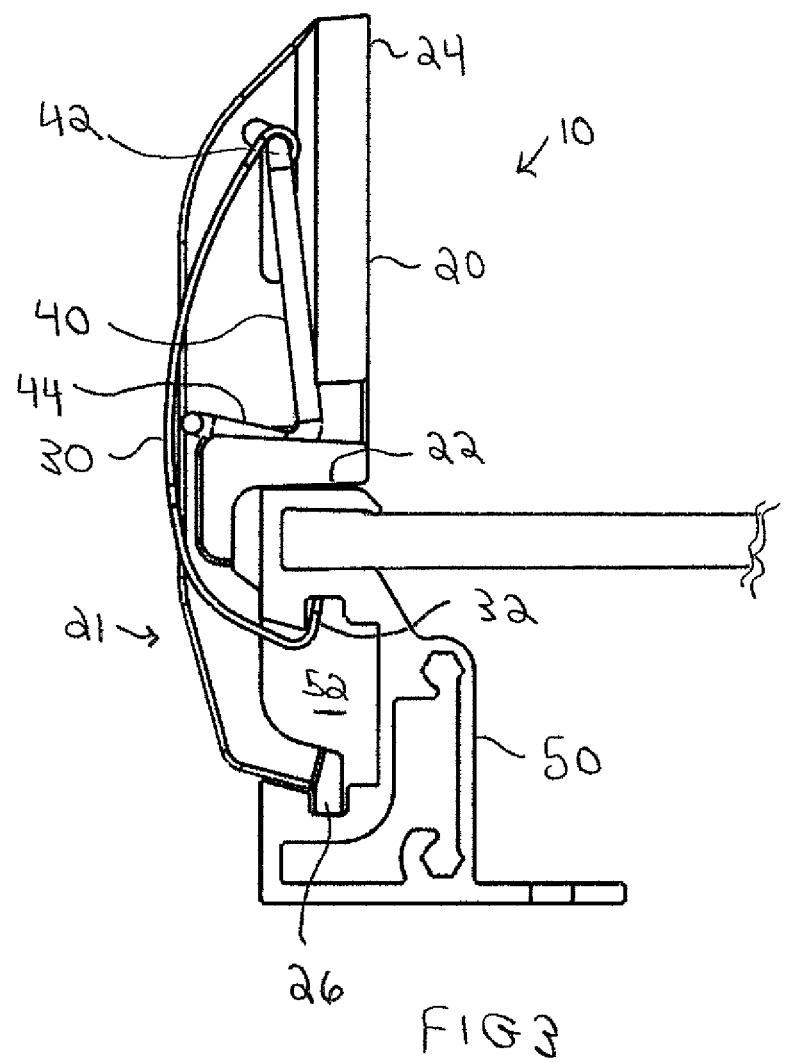
FIG. 3 is a sectional side elevation view corresponding to FIGS. 1 and 2.
Figure 4:
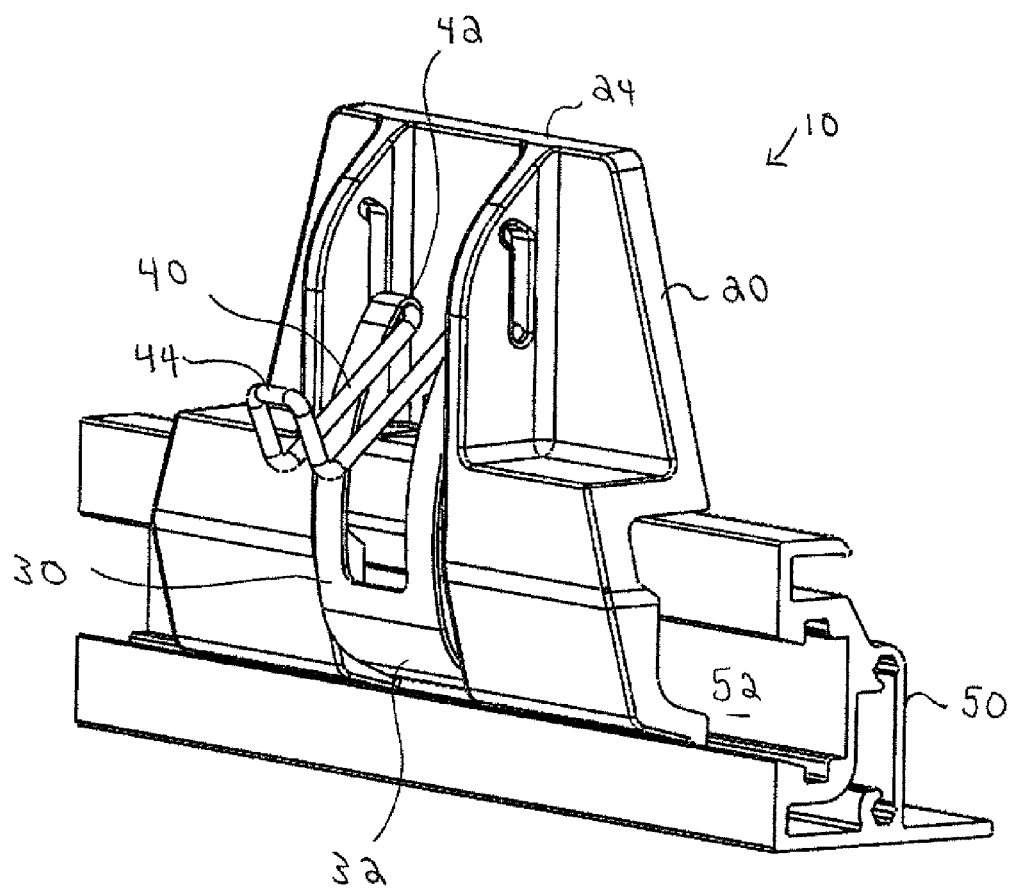
FIG. 4 is a front perspective view of the snow guard in the unlocked position.
Figure 5:
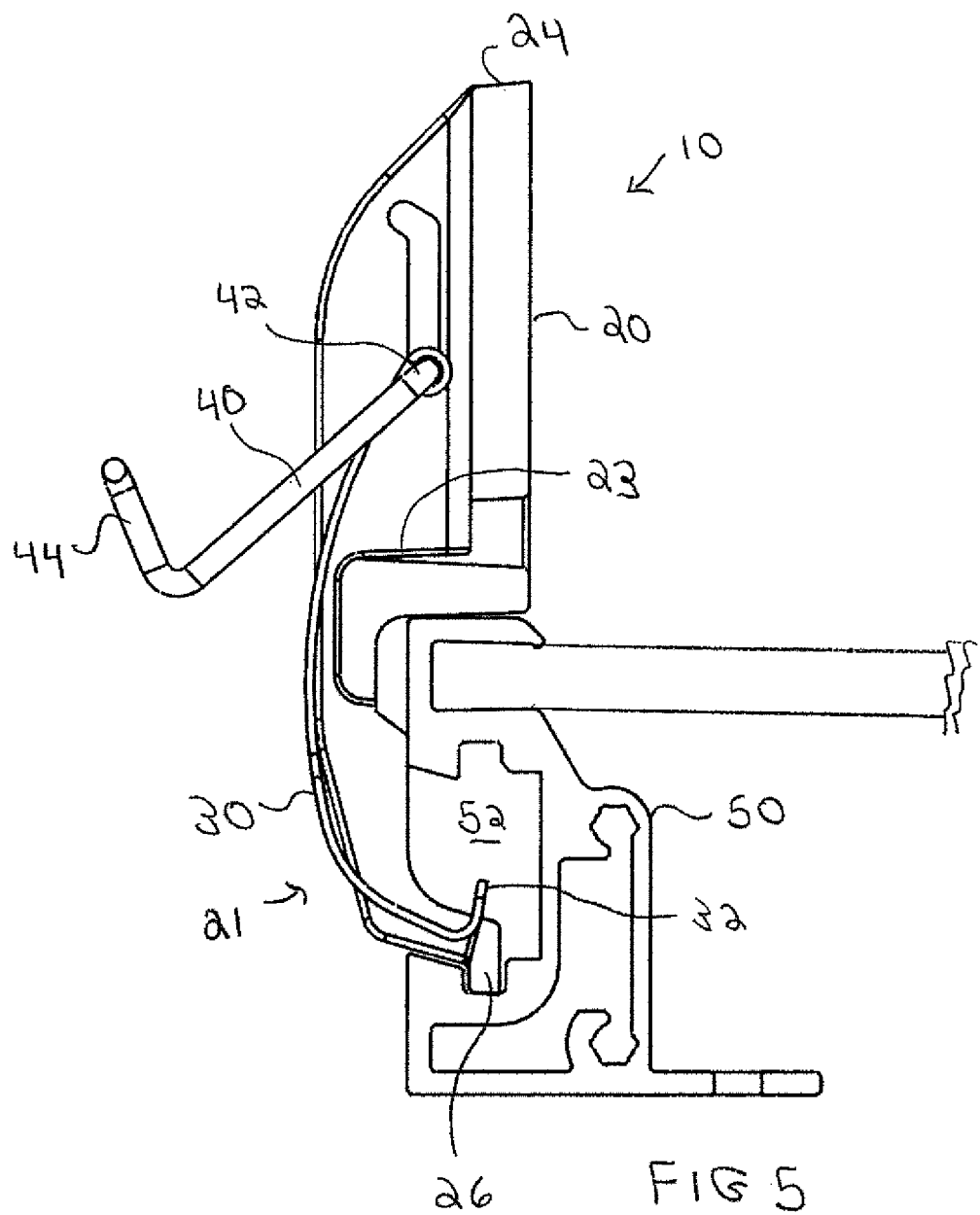
FIG. 5 is a sectional side elevation view corresponding to FIG. 4, further including a side of a photovoltaic module.

FIGS. 1, 2 and 3 show snow guard 10 in a locked position. FIGS. 4 and 5 show snow guard 10 in an unlocked position. As will be explained, snow guard 10 provides a fast and easy retrofit solution that can quickly be inserted into the gap between two photovoltaic modules and then snapped onto the side edge of one of the photovoltaic modules. As such, snow guard 10 can be quickly retrofit onto an existing photovoltaic array. An installer can even do this installation with one hand with no tools required.

In operation, an installer places individual snow guards 10 at regular intervals along the array (positioned between the photovoltaic modules in both X- and Y-directions). For example, one to three snow guards 10 may preferably be positioned along the length of the individual photovoltaic modules in the array. As such, snow guards 10 resemble little spikes that stick up between the photovoltaic modules such that the top surface of the overall array is not smooth. Snow guards 10 operate by preventing large blocks of ice and snow from sliding across the array and falling off the roof of the building. Instead, the use of snow guards 10 operates to permit the snow and ice to shed off the roof in small break-away sections.

Snow guard 10 preferably comprises a main body 20 and a clamp 30. Main body 20 has a support surface 22 dimensioned to sit on top of photovoltaic module frame 50, an upwardly facing snow retaining projection 24, and a grasping portion 26 dimensioned to be received into the bottom of a side groove 52 in photovoltaic module frame 50. Clamp 30 slides against a side of the main body 20 from an unlocked position (FIGS. 4 and 5) to a locked position (FIGS. 1, 2 and 3). Clamp 30 has a grasping portion 32 dimensioned to be received into the top of side groove 52 in photovoltaic module 50. As seen in FIGS. 2 and 3, grasping portion 32 engages with the top of side groove 52 when clamp 30 is in the locked (i.e.: fully upwards) position. As best seen in FIG. 3, grasping portion 32 of clamp 30 passes through an aperture 21 in the side of main body 20. Clamp 30 moves up and down along the side of main body 20. Therefore, grasping portion 32 of clamp 30 moves up and down in aperture 21 when the clamp is moved between the unlocked and locked positions.

A retaining mechanism 40 engages to hold clamp 30 in the locked position. Preferably, retaining mechanism 40 is a mechanical spring as shown. Most preferably, retaining mechanism 40 is a U-shaped mechanical spring. The operation of U-shaped mechanical spring 40 is best seen in FIGS. 4 and 5, as follows. Spring 40 has a pair of opposite ends 42 that connect to clamp 30 and a center section 44 that is received on top of a shelf 23 on the side of the main body when the clamp is in the locked (i.e.: upwards) position. In operation, mechanical spring 40 flexes when in the locked position to hold clamp 30 upwards such that grasping portion 32 of the clamp pushes against a top inside edge of side groove 52 when the support surface 22 of main body 20 pushes downwardly on the photovoltaic module.

Therefore, all an installer has to do is to position the snow guard (in the unlocked position shown in FIG. 4) into the side groove 52 (with grasping portion 26 resting in the bottom of side groove 52), and then push center section 44 of spring 40 onto shelf 23 (thus moving the device into the locked orientation shown in FIG. 1).

Figure 6:
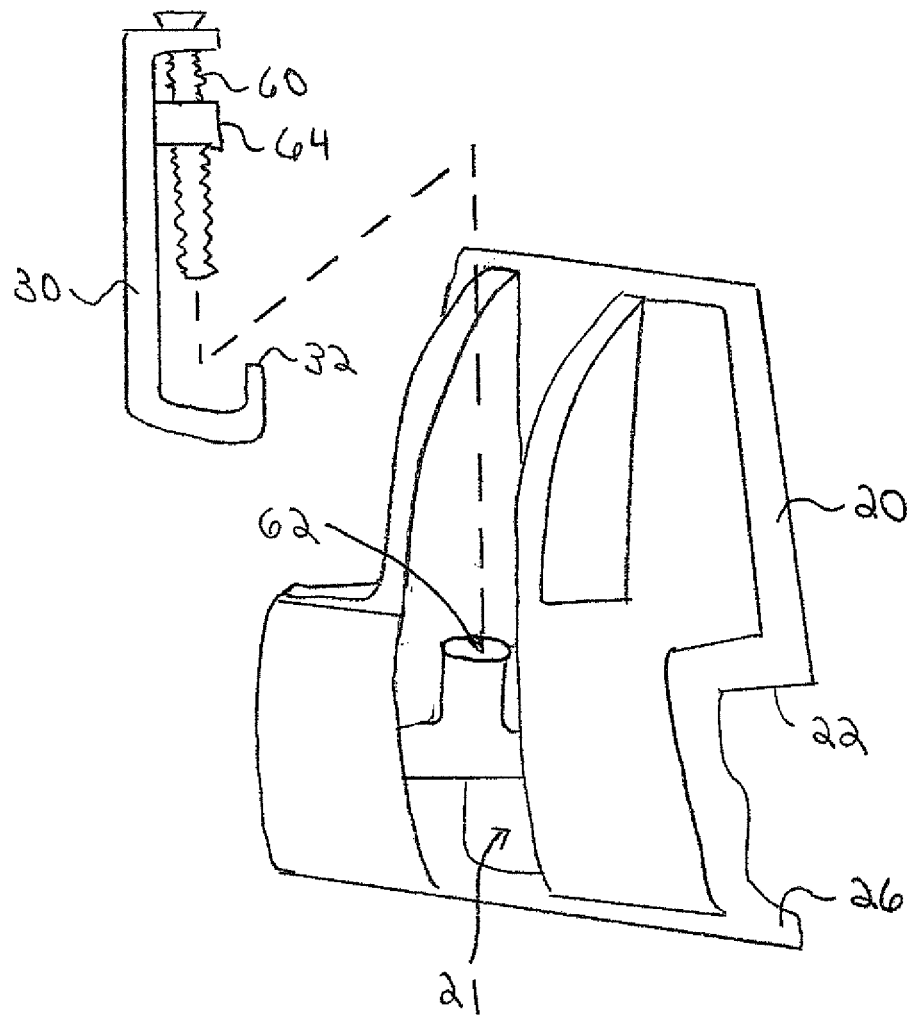
FIG. 6 is a front exploded perspective view of an alternate embodiment of the snow guard with a screw and fastener that slides a clamp up and down between the unlocked and locked positions.

FIG. 6 is a front exploded perspective view of an alternate embodiment of the snow guard with a screw and fastener that slides the clamp up and down between the unlocked and locked positions. (Note: for ease of viewing, clamp 30 is shown in side elevation view whereas main body 20 is shown in perspective view). In operation, screw 60 rotates within bore 62 on main body 20.

Screw 60 is also received through a threaded fastener 64. As screw 60 is rotated, is therefore moves threaded fastener 64 up or down. Since threaded fastener 64 sits on top of bore 62, the rotation of screw 60 will move clamp 30 up or down in aperture 21.

Lastly, FIG. 7 shows a front perspective view of an alternate embodiment of the snow guard for use with photovoltaic modules not having side grooves. In this embodiment, snow guard 10A will have both the main body 20A and the clamp 30A reaching around the underside of module frame 50 (see grasping portions 26A and 32A, thereby clamping snow guard 10A onto the side of a photovoltaic module frame 50.

What is claimed is:

1. A snow guard for a photovoltaic array, comprising:
   (a) a main body, the main body having a support surface that sits on top of a photovoltaic module, an upwardly facing snow retaining projection, and a grasping portion that is receivable into a side groove in the photovoltaic module;
   (b) a clamp that slides against a side of the main body from an unlocked position to a locked position, wherein the clamp has a grasping portion that is receivable into the side groove in the photovoltaic module, and wherein the grasping portion engages with the side groove when the clamp is in the locked position; and
   (c) a retaining mechanism that engages to hold the clamp in the locked position.

2. The snow guard of claim 1, wherein the grasping portion of the clamp passes through an aperture in the main body.

3. The snow guard of claim 2, wherein the grasping portion of the clamp moves up and down in the aperture when the clamp is moved between the unlocked and locked positions.

4. The snow guard of claim 1, wherein the retaining mechanism is a mechanical spring.

5. The snow guard of claim 4, wherein the mechanical spring is U-shaped.

6. The snow guard of claim 4, wherein the mechanical spring has a pair of opposite ends that connect to the clamp and a center section that is received against a shelf on the side of the main body when the clamp is in the locked position.

7. The snow guard of claim 6, wherein the mechanical spring flexes when in the locked position to hold the clamp upwards such that the grasping portion of the clamp pushes against a top edge of the side groove when the support surface of the main body pushes downwardly on the photovoltaic module.

8. The snow guard of claim 1, wherein the retaining mechanism is a screw and fastener that slides the clamp up and down between the unlocked and locked positions.

9. A snow guard for a photovoltaic array, comprising:
   (a) a main body, the main body having a support surface that sits on top of a photovoltaic module, an upwardly facing snow retaining projection, and a grasping portion that is receivable underneath a photovoltaic module;
   (b) a clamp that slides against a side of the main body from an unlocked position to a locked position, wherein the clamp has a grasping portion that is receivable underneath a side of the photovoltaic module; and
   (c) a retaining mechanism that engages to hold the clamp in the locked position.

10. The snow guard of claim 9, wherein the retaining mechanism is a mechanical spring.

11. The snow guard of claim 10, wherein the mechanical spring is U-shaped.

12. The snow guard of claim 10, wherein the mechanical spring has a pair of opposite ends that connect to the clamp and a center section that is received against a shelf on the side of the main body when the clamp is in the locked position.

* * * * *